US007032841B1

(12) United States Patent
Swisher

(10) Patent No.: US 7,032,841 B1
(45) Date of Patent: Apr. 25, 2006

(54) HAND-HELD BATTERY POWER SPRAYER

(76) Inventor: Steven L. Swisher, 3510 W. Atlanta St., Broken Arrow, OK (US) 74012

( * ) Notice: Subject to any disclaimer, the term of this patent is extended or adjusted under 35 U.S.C. 154(b) by 127 days.

(21) Appl. No.: 10/832,832

(22) Filed: Apr. 27, 2004

(51) Int. Cl.
*A01G 25/14* (2006.01)

(52) U.S. Cl. ...................... 239/375; 239/329; 239/331; 239/332; 239/333; 239/570; 239/571; 239/302; 239/347; 222/383.1; 222/333; 222/481.5; 222/465; 222/470

(58) Field of Classification Search ................ 239/329, 239/331, 332, 333, 570, 571; 222/383.1, 222/333, 481.5
See application file for complete search history.

(56) References Cited

U.S. PATENT DOCUMENTS 3,173,584 A 3/1965 Giavasis ..................... 222/263
3,901,449 A * 8/1975 Bochmann .................. 239/332
3,993,250 A 11/1976 Shure ......................... 239/332
4,222,525 A 9/1980 Hildebrandt ................ 239/343
5,150,841 A * 9/1992 Silvenis et al. ............. 239/332
5,244,126 A * 9/1993 Geier ....................... 222/383.1
5,397,034 A 3/1995 Wunsch ...................... 222/333
5,603,434 A * 2/1997 von Schuckmann ... 222/153.14
5,716,007 A * 2/1998 Nottingham et al. ....... 239/332
5,738,251 A * 4/1998 Schuckmann .......... 222/153.14
6,345,774 B1 * 2/2002 Calhoun ..................... 239/333
6,364,175 B1 * 4/2002 Bloom .................... 222/383.1
6,502,766 B1 * 1/2003 Streutker et al. ........... 239/332
6,811,099 B1 * 11/2004 Krestine et al. ............ 239/524

* cited by examiner

*Primary Examiner*—David A. Scherbel
*Assistant Examiner*—Trevor McGraw
(74) *Attorney, Agent, or Firm*—Paul H. Johnson; Gable and Gotwals

(57) ABSTRACT

A hand-held battery power sprayer is formed of a body having a spray nozzle, a trigger, and an internally threaded attachment collar having a passageway therethrough. The attachment collar removably receives a container. As battery powered pump is positioned within the body, the pump having an inlet and an outlet, the outlet being connected by a discharge tube to the spray nozzle and the inlet connected by a suction tube extending through the inlet collar passageway into the interior of a liquid-holding container when the container affixed to the attachment collar. A battery is contained within the body. A switch within the body is actuated by this trigger. Circuitry connects the battery, switch, and pump in series. A passive check valve member normally closes the passageway preventing fluid flow from the container into the body and is displaceable to permit air flow into the container.

7 Claims, 4 Drawing Sheets

HAND-HELD BATTERY POWER SPRAYER

REFERENCE TO PENDING APPLICATIONS

This application is not based upon any pending domestic or international patent application.

REFERENCE TO MICROFICHE APPENDIX

This application is not referenced in any microfiche appendix.

FIELD OF THE INVENTION

This invention is for a hand-held powered sprayer and particularly a hand-held battery powered liquid sprayer.

BACKGROUND OF THE INVENTION

A common item on the market today is a container of liquid that is manufactured and sold for distribution by spraying. Liquids are sprayed primarily in order to atomize or produce fine droplets in the air that impinge on a surface. Such atomization permits a better coverage of a surface by liquids and for this reason the preferred method of distributing many products is by spraying. For instance, window washing solutions are most ideally applied by spraying. Odor, bacterial and fungus eradicating solutions are typically used by spraying. Many cleaning solutions are best used by spraying, such as for cleaning oven interiors. Liquids are commonly available for spraying plants to enhance appearance or for fertilization, or in some cases, for eradication. There is virtually an unlimited number of applications of liquids that are dispensed by spraying.

For this reason, many liquids are sold in containers that have an attached hand operated sprayer. That is, having the type of sprayer that has a trigger or lever which, when manually activated, causes liquid to be atomized or dispensed in small droplets. These manually-activated sprayers require the user to sequentially squeeze a lever or a trigger. To maintain a uniform spray pattern, a user must operate the lever or trigger rapidly while at the same time moving the container if a large area is to be covered.

Many liquids are sold in bottles with a removable cap so that a sprayer can be attached to the container with the idea that the hand-held sprayer can be repeatedly used for different containers.

The typical hand-operated sprayer employed on the market today works satisfactorily if only a relatively small quantity is to be dispensed. However, if the user wishes to spray larger areas, the use of a hand-operated sprayer can become burdensome. For this reason, it has been suggested that hand-held sprayers can be supplied with electric power. A preferred method of supplying electric power is by use of a battery. The U.S. Pat. No. 6,502,766 that issued on Jan. 7, 2003, and entitled, "Liquid Sprayers" illustrates a hand-held sprayer that is attached to a container in an arrangement wherein the sprayer is powered by self-contained batteries. This patent is an example of the type of apparatus to which this application pertains.

For additional background information relating to hand-held sprayers reference may be had to the following previously-issued United States patents:

| U.S. Pat. No. | Inventor(s) | Title |
|---|---|---|
| 3,173,584 | Giavasis | Portable Motor Driven Dispensing Devices |
| 3,993,250 | Shure | Apparatus For Spraying Liquid Materials |
| 4,222,525 | Hildebrandt | Arrangement For Spraying Liquid From A Bottle |
| 5,150,841 | Silvenis, et al. | Liquid Spray Dispenser |
| 5,397,034 | Wunsch | Finely Atomizing Device For Fluids |
| 5,716,007 | Nottingham, et al. | Battery Operated Fluid Dispenser |
| 6,502,766 | Streutker, et al. | Liquid Sprayers |

BRIEF SUMMARY OF THE INVENTION

The invention herein is a hand-held power sprayer including a body having a spray nozzle, a trigger and an internally-threaded attachment collar that has a passageway therethrough. The attachment collar is adapted to threadably attach to a liquid container. A motor-powered pump is contained within the body and has a pump inlet and pump outlet. The pump outlet is connected by a discharge tube to the spray nozzle and the inlet is connected by a suction tube extending through the passageway in the threaded attachment and into the interior of a liquid-holding container when affixed to the attachment collar.

While the motor-powered pump can be powered by an electrical cord extending from the body a much preferred power source is a battery positioned within the sprayer body.

A switch is affixed to the body and arranged to be actuated between open and close positions. Circuitry within the body connects the battery, switch and pump motor in series so that when the switch is depressed, then pump motor is energized.

A unique feature of the invention herein is a passive check valve normally closing the attachment collar passageway for preventing inadvertent fluid flow (spillage) from a container that is attached to the body. The passive check valve normally closes the passageway but is displaceable to permit airflow from the body through the passageway into the container to equalize pressure within the container as liquid is discharged from it.

A better understanding of the invention will be obtained from the following detailed description of the preferred embodiment and the claims, taken in conjunction with the attached drawings.

BRIEF DESCRIPTION OF THE DRAWINGS

FIG. 5 shows the details of the internal arrangement of the hand-held sprayer.

DETAILED DESCRIPTION OF THE PREFERRED EMBODIMENTS

It is understood that this invention is not limited to the details of construction and arrangement of parts and components illustrated in the accompanying drawings. The invention is capable of other embodiments. Further, the phraseology and terminology employed herein are for purposes of description and not of limitation.

Elements employed in illustrating a preferred embodiment of the invention are identified by numbers indicated herein below:

| | |
|---|---|
| 10 | hand held sprayer |
| 12 | container |
| 14 | body |
| 16 | top |
| 18 | rearward surface |
| 20 | forward surface |
| 22 | trigger |
| 24 | bottom end |
| 26 | attachment collar |
| 30 | rearward projection portion |
| 32 | forward end |
| 34 | spray nozzle |
| 36 | suction tube |
| 38 | pump |
| 40 | discharge tube |
| 42 | inlet tube |
| 44 | outlet opening |
| 46 | circuitry |
| 48 | switch |
| 50 | battery |
| 52 | passive check valve system |
| 54 | retainer disc |
| 56 | upper ledges |
| 58 | lower ledges |
| 60 | central opening |
| 62 | central opening |
| 64 | tubular coupling member |
| 66 | flange |
| 68 | circumferential groove |
| 70 | keeper |
| 72 | internal threads |
| 74 | externally threaded neck of container 12 |
| 76 | gasket |
| 78 | top circumferential edge |
| 80 | top portion |
| 82 | small openings |
| 84 | radial grooves |
| 86 | circumferential groove |
| 88 | check valve member |
| 90 | central opening |
| 92 | circumferential sealing edge |
| 94 | interior planar surface |
| 98 | lower end portion |

Figure 2:
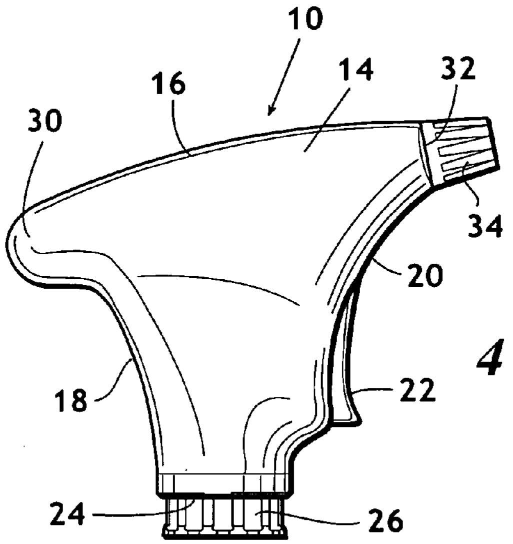
FIG. 2 is an elevational view of the opposite side view of the hand-held sprayer shown in FIG. 1.
Figure 1:
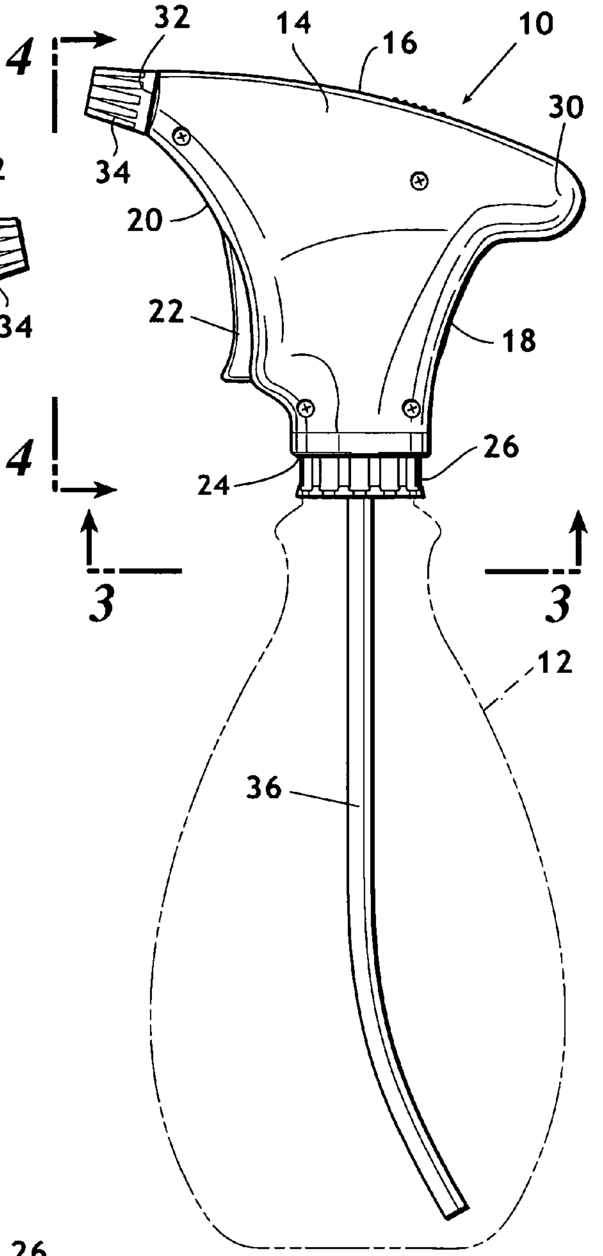
FIG. 1 is an elevational view of a hand-held battery powered sprayer of this invention. The sprayer is shown affixed to the top of a liquid container shown in dotted outline.
Figure 3:
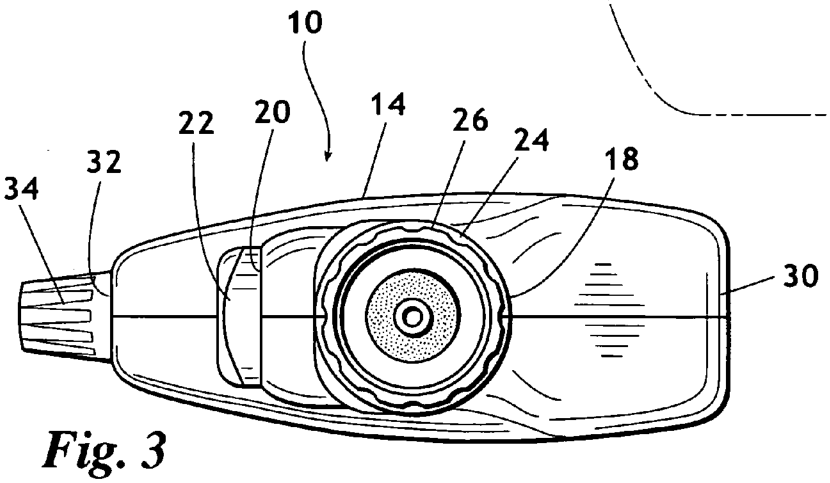
FIG. 3 is a bottom view taken along the line 3—3 FIG. 1 showing the hand-held sprayer without the container attached.

Referring to the drawings and first to FIGS. 1, 2, 3 and 4, a typical external appearance of a hand-held battery powered sprayer that can be used for practicing the principles of this invention is illustrated. The hand-held sprayer is generally indicated by the numeral 10 and, in FIG. 1 is shown in solid outline and attached to a typical container 12 shown in dotted outline. The hand-held sprayer 10 includes a body 14 that may typically be formed of plastic. The body has a top 16. A rearward surface 18 is configured to fit the palm of the hand of a user. A forward surface 20 of the sprayer 10 includes a displaceable trigger 22. Trigger 22 is positioned opposite the rearward surface 18 and arranged for actuation by a finger or fingers of a user holding the sprayer.

A bottom end 24 of sprayer body 14 receives a rotatable attachment collar 26 by which a container can be affixed, such as container 12 as shown in FIG. 1.

The rearward surface 18 is configured with an upper rearwardly projecting portion 30 to resist the possibility of the sprayer body 14 falling downwardly through the hand of a user.

At a forward end 32 of body 14 is a spray nozzle 34.

FIG. 1 shows a suction tube 36 that extends from the hand-held sprayer body 14 into container 12 providing means for withdrawing liquid from the container when trigger 22 is depressed.

Figure 5:
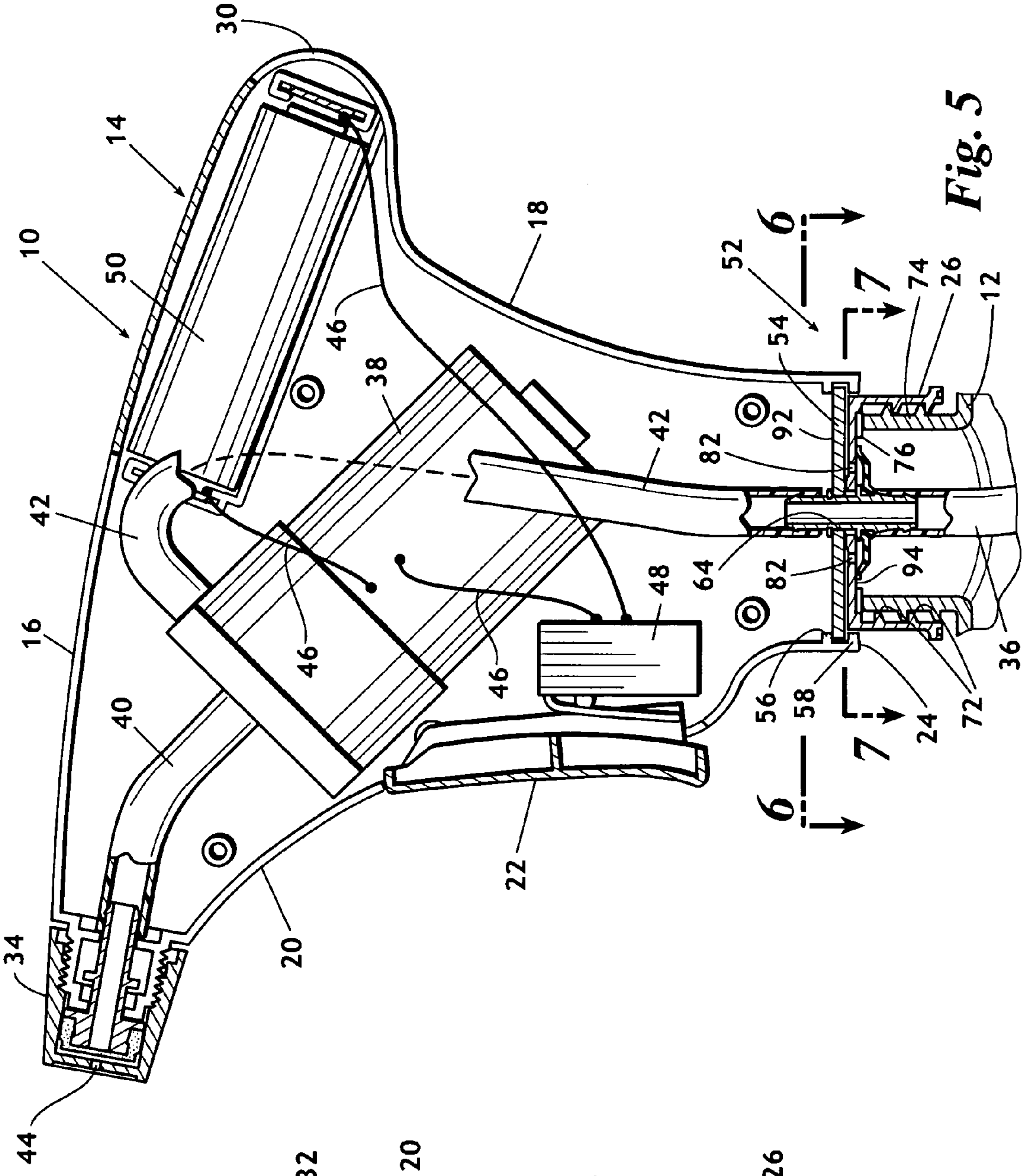
FIG. 5 is an enlarged cross-sectional elevational view of the hand-held sprayer as taken along the line 5—5 of FIG. 4.
Figure 4:
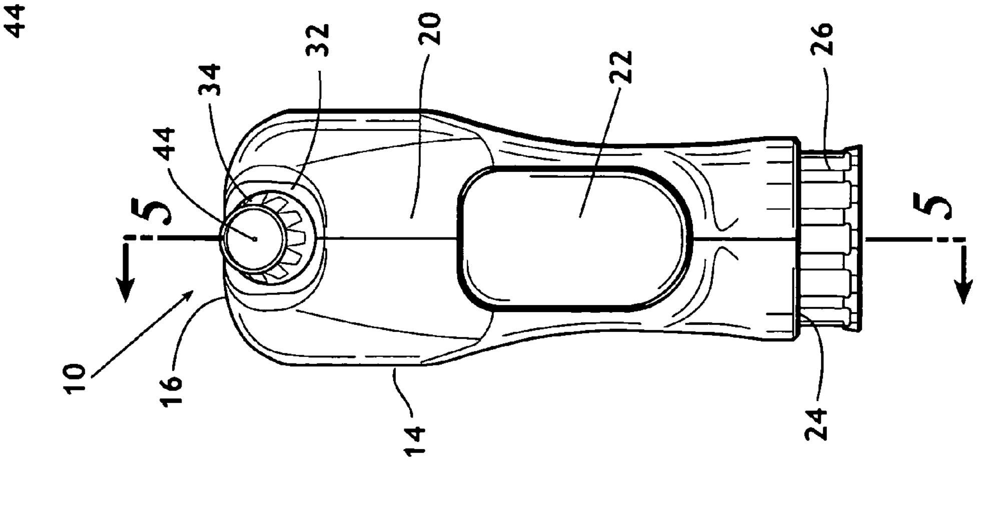
FIG. 4 is a front elevational view taken along the line 4—4 of FIG. 1.
Figure 6:
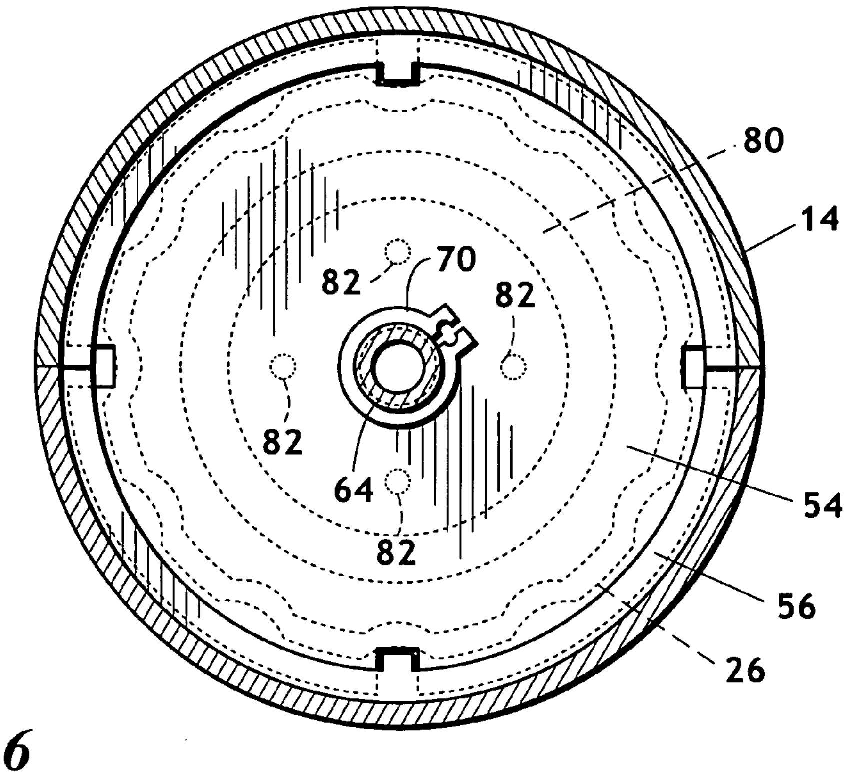
FIG. 6 is an enlarged horizontal cross-sectional view taken along the line 6—6 of FIG. 5.
Figure 7:
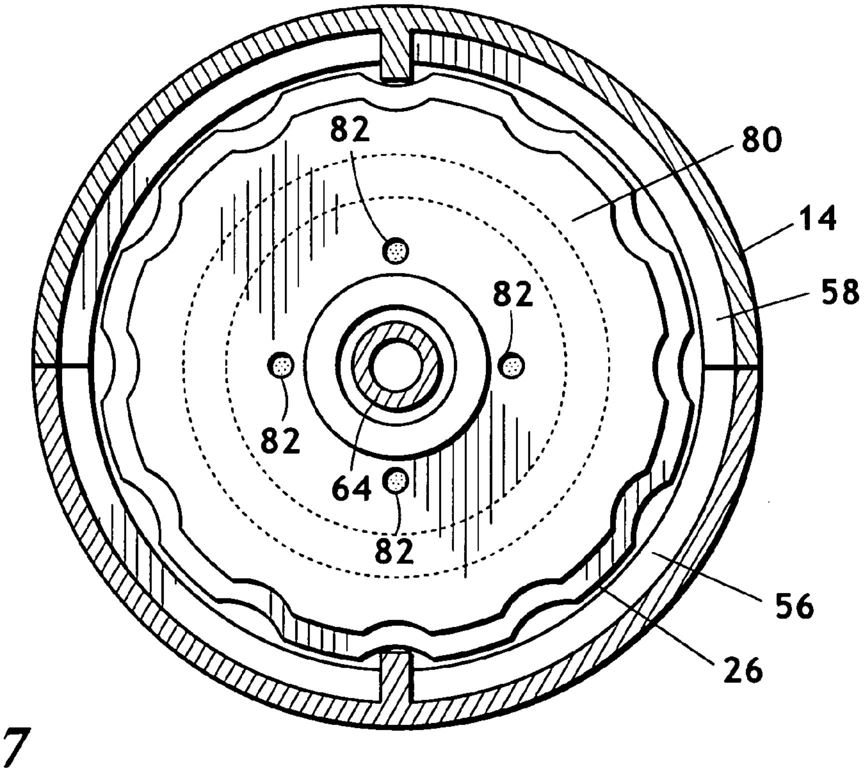
FIG. 7 is an enlarged horizontal cross-sectional view taken along the line 7—7 of FIG. 5.

The internal arrangement of the sprayer of this invention is best illustrated in the cross-sectional view of FIG. 5. Positioned within sprayer body 14 is a powered pump 38 that has an inlet and an outlet. The pump outlet receives a discharge tube 40 that extends to sprayer nozzle 34. The pump inlet is connected to a suction tube 42. When pump 38 is energized, liquid is pumped from container 12 and flow by way of suction tube 36, inlet tube 42, pump 38, discharge tube 40 and is discharged through an outlet opening 44 in spray nozzle 34. Circuitry 46 connects pump 38 in series with a switch 48 and a battery 50. Trigger 22 actuates switch 48 so that when it is depressed energy is supplied from battery 50 to actuate the pump to thereby pump liquid from container 12 and discharge it out the pump nozzle 34.

Some means must be provided to prevent liquid carried by container 24 from being spilled if the container is inadvertently turned on its side. At the same time, means must be provided to permit air to be drawn into the interior of container 12 as liquid therein is pumped out. To accomplish these two purposes, an important feature of the invention herein is the provision of a passive check valve system generally indicated by the numeral 52 in FIGS. 5 and 8. The passive check valve system is described with reference to FIGS. 5, 6, 7 and 8. These Figures show details of the attachment collar 26 and the associated passive check valve system. Retained by the molded components that make up the sprayer body 14 as shown in FIG. 5, is a retainer disk 54. Upper and lower circumferential internal ledges 56 and 58 that are parts of body 14, surround and hold retainer disc 54 in place. The retainer disc has a central opening 60 (see FIG. 8) and in like manner attachment collar 26 has a matching central opening 62. These openings 60 and 62 received a tubular coupling member 64 that has an external integral flange 66 that fits against the interior bottom surface of attachment collar 26. Tubular coupling member 64 has a circumferential groove 68 spaced from flange 66. After tubular coupling member 64 is telescopically extended through opening 62 in attachment collar 26 and opening 60 in retainer disk 54 a keeper 70 is positioned around the collar and received in groove 68. Thus, the attachment collar 26 is secured to bottom end 24 of hand-held sprayer body 14 and in a manner that permits it to be manually rotated. The attachment collar 26 has internal threads 72 as seen in FIG. 5 by which it is threadably affixed to the externally threaded neck 74 of container 12.

A toroidal gasket 76 is received between the inner surface of attachment collar 26 and the top circumferential edge 78 of container 12.

Attachment collar 26 includes an integral horizontal flat top portion 80 (see FIG. 8) that has four small diameter openings 82 therein. Small openings 82 are spaced from each other and spaced away from central opening 62. These small openings 82 provide access for air to enter container 12 as liquid is withdrawn from within the container 12. Air flow radial grooves 84 (See FIG. 8) extend from each of the small openings 82 to the peripheral edge of attachment collar 26 to ensure the free flow of air through the openings.

Figure 8:
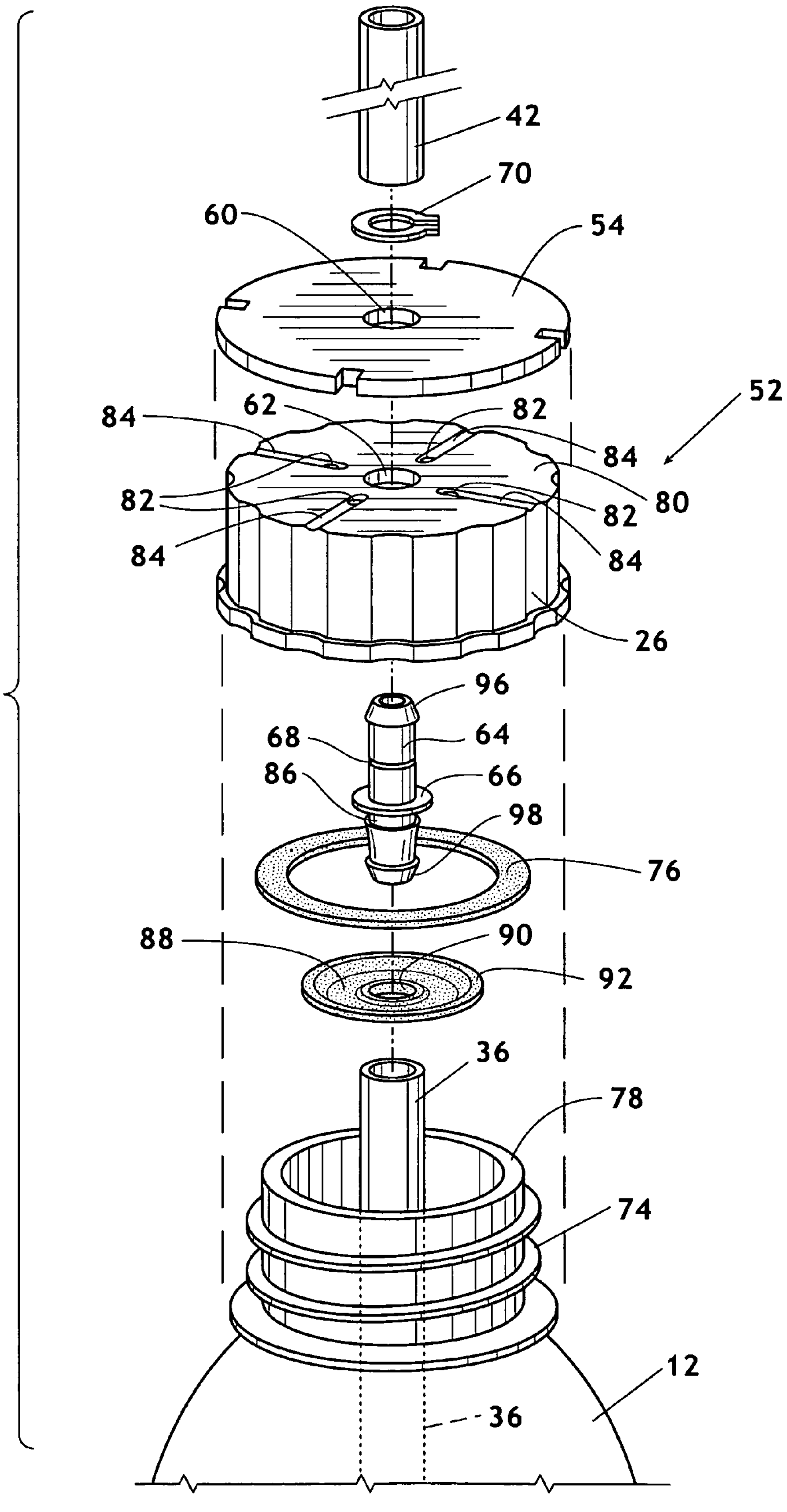
FIG. 8 is an exploded view of the elements of the invention making up the attachment collar and the passive check valve.

As seen in FIGS. 5 and 8, tubular coupling member 64 has, on its external cylindrical surface, and immediately below and adjacent to flange 66, a circumferential groove 86. A passive check valve member 88 is formed of resilient and deflectable material, and as seen in FIG. 8, has a central opening 90 therein. Passive check valve member 88 is assembled onto and retained by tubular coupling member 64 by elastomeric expansion. Central opening 90 of check valve member 88 is received in circumferential groove 86.

Check valve member 88 has a circumferential edge 92 that sealably engages the interior planar surface of the attachment collar top portion 80. This interior planar surface is identified by the numeral 94 in FIG. 5. As long as the circumferential edge 92 of check valve member 88 is in engagement with interior planar surface 94 of attachment collar 26 leakage of fluid from within the container 12 is prevented. However, as liquid is withdrawn from container 12 by the operation of pump 38, air can be drawn into the container through openings 82 and radial grooves 84 by the slight deflection of the circumferential edge 92 of check valve member 88.

As seen in FIG. 5, inlet tube 42 is telescopically positioned on an upper end portion 96 (FIG. 8) of tubular coupling member 64 and in like manner, suction tube 36 is telescopically received on a lower end portion 98 (FIG. 8) of tubular coupling member 64.

It can thus be seen that the hand-held sprayer of this invention is compact and removably attachable to a container having an externally threaded neck portion. The sprayer includes a passive valve system that prevents spilling in the event the container is overturned while at the same time air is permitted to freely pass to equalize pressure within the container as liquid is withdrawn from it.

It is understood that the invention herein is not limited to the exact construction of the illustrated and described preferred embodiment of the invention, but is to be limited only by the scope of the attached claim or claims, including the full range of equivalency to which each element is entitled.

What is claimed is:

1. A hand-held powered sprayer comprising:

a body having a spray nozzle, a trigger, and an internally threaded attachment collar having a a central opening and a plurality of laterally spaced small diameter openings therethrough;

a motor powered pump within said body having an inlet and an outlet, the outlet connected by a discharge tube to said spray nozzle and the inlet connected by a suction tube extendable through said central opening into the interior of a liquid-holding container when affixed to said attachment collar;

a voltage source for powering said pump;

a switch within said body actuatable between open and closed conditions by said trigger;

a battery received within said body;

circuitry within said body connecting said battery, said switch and said motor; and a check valve surrounding said suction tube and normally closing said small diameter openings preventing liquid flow into said body and displaceable to permit air flow from said body through said small diameter openings.

2. A hand-held powered sprayer according to claim 1 wherein said check valve has a circumferential lip normally in sealed engagement with a planar sealing surface surrounding said suction tube.

3. A hand-held powered sprayer according to claim 1 wherein said check valve has an opening sealably receiving said suction tube.

4. A hand-held powered sprayer according to claim 2 wherein said planar sealing surface is provided by an interior surface of said attachment collar.

5. A hand-held powered sprayer according to claim 1 including a tubular coupling member sealably received in said attachment collar central opening and having an upper and a lower end and wherein said suction tube is formed by an upper portion and a lower portion, the upper portion connecting said pump inlet to said tubular coupling member upper end, the lower portion connected to said tubular coupling member lower end and extendable into the interior of a liquid-holding container when affixed to said attachment collar.

6. A hand-held powered sprayer according to claim 5 wherein said check valve is in the form of a flexible disc having a central opening therethrough sealably receiving said coupling member.

7. A hand-held powered prayer according to claim 5 wherein said attachment collar is rotatably received on said coupling member.

* * * * *